(12) United States Patent
Chan et al.

(10) Patent No.: US 9,497,251 B2
(45) Date of Patent: Nov. 15, 2016

(54) SERVING OF WEB PAGES ACCORDING TO WEB SITE LAUNCH TIMES

(71) Applicant: Yahoo! Inc., Sunnyvale, CA (US)

(72) Inventors: Shu Kit Chan, Foster City, CA (US); Chiranjeevi Jaladi, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 392 days.

(21) Appl. No.: 13/941,294

(22) Filed: Jul. 12, 2013

(65) Prior Publication Data

US 2015/0019622 A1 Jan. 15, 2015

(51) Int. Cl.
*G06F 15/16* (2006.01)
*H04L 29/08* (2006.01)

(52) U.S. Cl.
CPC .......... *H04L 67/02* (2013.01); *H04L 67/2814* (2013.01)

(58) Field of Classification Search
CPC .................... H04L 67/02; H04L 67/2814
USPC ................ 709/202–203, 217–219, 227–229
See application file for complete search history.

(56) References Cited

U.S. PATENT DOCUMENTS

| | | | | |
|---|---|---|---|---|
| 7,127,500 B1* | 10/2006 | Hellman | ............. | H04L 67/2814 709/203 |
| 7,640,347 B1* | 12/2009 | Sloat | ....................... | H04L 67/02 709/203 |
| 7,698,735 B2* | 4/2010 | Dujari | ..................... | H04L 67/02 709/203 |
| 7,921,226 B2* | 4/2011 | Mukherjee | .......... | H04L 67/2814 709/238 |
| 8,103,783 B2* | 1/2012 | Plamondon | ............. | H04L 67/02 709/203 |
| 8,275,829 B2* | 9/2012 | Plamondon | ............. | H04L 67/02 709/203 |
| 2012/0191862 A1* | 7/2012 | Kovvali | ................. | H04L 67/28 709/227 |
| 2012/0203873 A1* | 8/2012 | Lewin | ................ | H04L 67/2842 709/219 |

OTHER PUBLICATIONS

Wikipedia, "Edge Side Includes," Mar. 14, 2013, downloaded from http://en.wikipedia.org/wiki/Edge_Side_Includes.
Fielding, R. et al., "Hypertext Transfer Protocol—HTTP/1.1," Network Working Group RFC 2616, Jun. 1999, downloaded from http://www.ietf.org/rfc/rfc2616.txt.

\* cited by examiner

*Primary Examiner* — Bharat N Barot
(74) *Attorney, Agent, or Firm* — Weaver Austin Villeneuve & Sampson LLP

(57) ABSTRACT

In one embodiment, a request identifying a first Uniform Resource Locator (URL) may be received. It may be ascertained whether a launch time associated with the first URL has been attained. An Edge Side Includes (ESI) response may be automatically provided according to a result of the ascertaining, wherein the ESI response includes instructions to fetch a web page associated with the first URL from an origin server.

14 Claims, 7 Drawing Sheets

SERVING OF WEB PAGES ACCORDING TO WEB SITE LAUNCH TIMES

BACKGROUND

The disclosed embodiments relate generally to methods and apparatus for launching web sites.

In order to launch a web site, application code is installed on a computer. In order to build a scalable web site, application code may be installed on multiple computers. Sometimes, it is desirable to launch a web site at a particular time, which may be advertised to the public.

The installation of application code is typically accomplished manually. However, the installation becomes a difficult and complex process when the application code or portion thereof is to be installed on multiple computers for access at a particular launch time.

SUMMARY

The disclosed embodiments support the timely launch of web sites. More particularly, prior to a launch of a web site, visitors to a first Uniform Resource Locator (URL) will be redirected to a second URL. However, after the launch of the web site, visitors to the URL will no longer be redirected.

In one embodiment, a request identifying a first Uniform Resource Locator (URL) may be received. It may be ascertained whether a launch time associated with the first URL has been attained. An Edge Side Includes (ESI) response may be automatically provided according to a result of the ascertaining, wherein the ESI response includes instructions to fetch a web page associated with the first URL from an origin server.

In another embodiment, when it is ascertained that a launch time associated with the first URL has been attained, a cacheable ESI response may be generated and sent (e.g., by an ESI service). Upon receipt (e.g., by a Traffic Server), the cacheable ESI response may be cached for subsequent retrieval. A web page associated with the first URL may be fetched (e.g., by the Traffic Server) from an origin server according to instructions provided in the ESI response.

In another embodiment, when it is ascertained that a launch time associated with the first URL has not been attained, a redirect response may be sent, where the redirect response identifies the second URL. More particularly, a cacheable redirect response may be generated and sent (e.g., by an ESI service). Upon receipt (e.g., by a Traffic Server), the cacheable redirect response may be cached for subsequent retrieval (e.g., in response to subsequent requests identifying the first URL that are received prior to completion of the launch associated with the first URL). The cacheable redirect response that is received or retrieved from a cache may be returned (e.g., by the Traffic Server) in response to the request identifying the first URL.

Various embodiments may be implemented via a device comprising a processor, memory, and a display. The processor and memory are configured to perform one or more of the above described method operations. Other embodiments may be implemented via a computer readable storage medium having computer program instructions stored thereon that are arranged to perform one or more of the above described method operations.

These and other features and advantages of the disclosed embodiments will be presented in more detail in the following specification and the accompanying figures which illustrate by way of example the principles of the disclosed embodiments.

DETAILED DESCRIPTION OF THE SPECIFIC EMBODIMENTS

Figure 1:
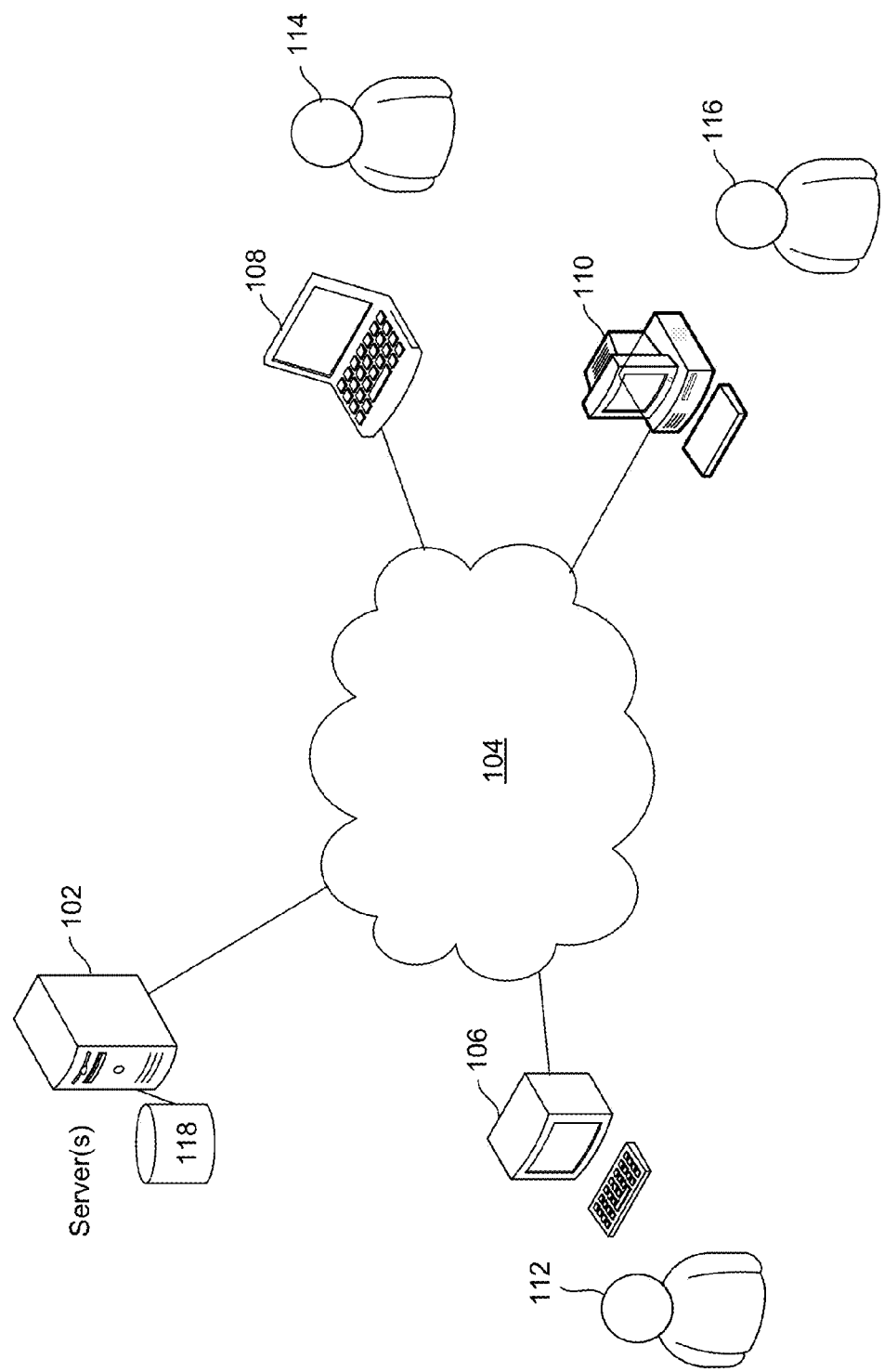
FIG. 1 is a diagram illustrating an example system in which various embodiments may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Often, when a web site launch is planned, an anticipated launch date and time are published. Prior to the launch of the web site, application software instructions may be generated or updated. Where the web site is hosted by multiple computers, it is particularly difficult to ensure that the software instructions are pushed to all of the computers at the same exact second. While it is possible to program the launch date and time into the software instructions, this increases the production time and it would not be possible to make any changes to the date or time of launch without updating the software instructions on all of the computers.

Example System

FIG. 1 is a diagram illustrating an example system in which various embodiments may be implemented. As shown in FIG. 1, the system may include one or more servers 102. At least one of the servers 102 may support the automated launching of web sites. As will be described in further detail below, the servers 102 may include one or more Traffic Servers, as well as one or more servers supporting an Edge Side Includes (ESI) Service. Various systems and processes implementing the automated launching of web sites will be described in further detail below with reference to FIGS. 2 through 4.

In accordance with various embodiments, the servers 102 may be associated with a web site such as a social networking web site. Examples of social networking web sites include Yahoo, Facebook, Tumblr, LinkedIn, Flickr, and Meme. The server(s) 102 may enable the web site to provide a variety of services to its users. More particularly, users of the web site may create, activate, update, delete, deactivate, or otherwise change the status or state of user accounts. In addition, users of the web site may access user accounts or public user profiles, interact with other members of the web site, upload files (e.g., photographs, videos), purchase goods or services, access information posted on the web site, etc.

In this example, the server(s) 102 may obtain or otherwise receive data (e.g., account data and/or user profile) and/or requests (e.g., requests to access the web site, search requests or account requests pertaining to a particular user account). Requests may include requests sent via the Internet 104 from one or more computers 106, 108, 110 in association with corresponding entities 112, 114, 116, respectively. For example, each of the entities 112, 114, 116 may be an individual such as a user of the web site or an individual operating on behalf of a group of individuals (e.g., group, business, company, or web site).

The server(s) 102 may have access to one or more data stores 118, which may include one or more memories. More particularly, the data stores 118 may include account information (e.g., data) for a plurality of user accounts. Therefore, account information pertaining to user accounts may be retained in one or more memories that are coupled to the server 102.

The account information retained in the data stores 118 may include financial information such as credit card information, enabling goods or services provided in association with the account to be purchased. In addition, the account information may include information pertaining to goods or services available to the user via the user account or used by the user. More particularly, the account information may indicate an amount and/or quality of the goods or services available to the user or used by the user. In addition, the account information may indicate a cost associated with the amount and/or quality of goods or services available to the user or used by the user.

The account information may also include or be linked to additional information pertaining to the user. For example, the server(s) 102 may have access to additional user information, which may be retained in one or more user logs stored in the data stores 118. This user information or a portion thereof may be referred to as a user profile. More particularly, the user profile may include public information that is available in a public profile and/or private information. Furthermore, the user profile may include information that has been submitted by the user and/or information that has been deduced or automatically collected by the system (e.g., based upon user action(s)).

The user information retained in the user logs 118 may include personal information such as demographic information (e.g., age and/or gender) and/or geographic information (e.g., residence address, work address, and/or zip code). In addition, each time a user performs online activities such as clicking on an advertisement, purchasing goods or services, posting information or content (e.g., on a web site or within the user's public profile), or annotating content, information regarding such activity or activities may be retained as user data in the user logs 118. For instance, the user data that is retained in the user logs 118 may indicate the identity of web sites visited, identity of ads that have been selected (e.g., clicked on) and/or a timestamp. Moreover, where the online publisher supports a search engine (e.g., via the server 102 or a separate search server), information associated with a search query, such as search term(s) of the search query, information indicating characteristics of search results that have been selected (e.g., clicked on) by the user, and/or associated timestamp may also be retained in the user logs 118. A user may be identified in the user logs 118 by a user ID (e.g., user account ID), information in a user cookie, etc.

A profile builder may initiate generation of a profile, such as for users of an application, including a search engine, for example. A profile builder may initiate generation of a user profile for use, for example, by a user, as well as by an entity that may have provided the application. For example, a profile builder may enhance relevance determinations and thereby assist in indexing, searching or ranking search results. Therefore, a search engine provider may employ a profile builder, for example.

A variety of mechanisms may be implemented to generate a profile including, but not limited to, collecting or mining navigation history, stored documents, tags, or annotations, to provide a few examples. A profile builder may store a generated profile. Through the use of user profiles of a search engine, for example, a search engine provider may to retrieve annotations, tags, stored pages, navigation history, or the like, which may be useful for making relevance determinations of search results, such as with respect to a particular user.

Automated Redirection Until Launch of Web Site

The disclosed embodiments support the automated launching of web sites at precise times without human intervention. Typically, a web site may be "launched" by installing software instructions on a set of one or more computers, which may be located at separate locations or geographic regions. These software instructions may be installed by "pushing" the software instructions to the set of computers. The software instructions may include a set of instructions including all instructions used to generate a web page. Alternatively, the software instructions may include only a subset of the set of instructions used to generate a web page, where the subset of the set of instructions provides one or more features of the web page. In other words, the software instructions that are installed may add to, replace, or modify the set of instructions that has previously been installed on the computers.

In accordance with various embodiments, prior to launch, visitors to a first URL (e.g., http://electriccity.yahoo.com), which may be referred to as a vanity URL, may be redirected to a second URL (e.g., http://screen.yahoo.com). On a scheduled day of launch at a scheduled time of launch, visitors to the first URL will no longer be redirected and will be shown the live web site instead.

In some embodiments, there may be a single scheduled launch time, which may be designated by a scheduled day of launch and a scheduled time of launch. In other embodiments, there may be multiple scheduled launch times, where each of the scheduled launch times is designated by a corresponding scheduled day of launch and scheduled time of launch.

Figure 2:
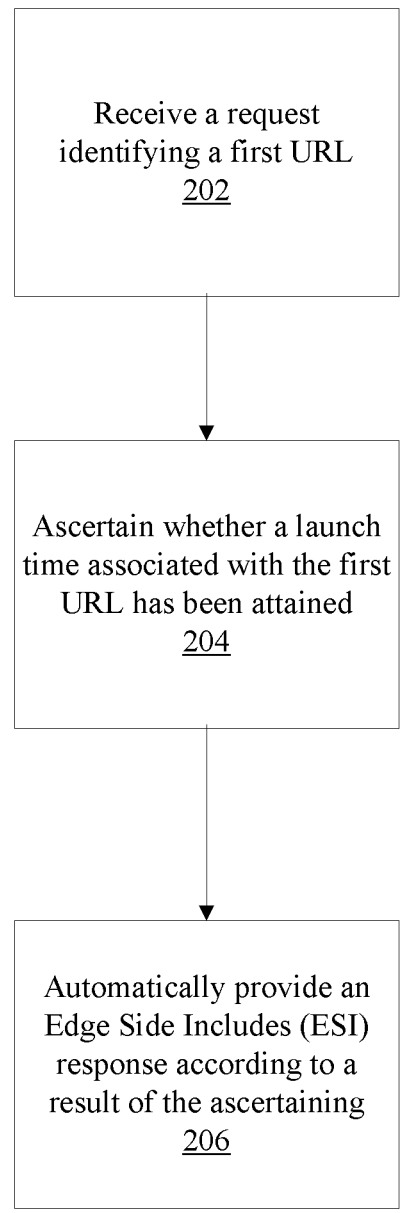
FIG. 2 is a process flow diagram illustrating an example method of processing a request in accordance with various embodiments.

FIG. 2 is a process flow diagram illustrating an example method of processing a request in accordance with various embodiments. When a user visits a first Uniform Resource Locator (URL), a request identifying the first URL may be transmitted. For example, the request may be a Hypertext Transfer Protocol (HTTP) request. Upon receiving the request identifying the first URL at 202, it may be ascertained whether a launch time associated with the first URL has been attained at 204. An ESI response may be automatically provided at 206 according to a result of the ascertaining More particularly, if it is ascertained that a launch time associated with the first URL has not been attained, a redirect to a second URL may be provided. However, if it is ascertained that a launch time associated with the first URL has been attained, an ESI response may be provided, where the ESI response includes instructions to fetch a web page associated with the first URL from an origin server. Example implementations will be described in further detail below with reference to FIGS. 3-4.

Serving of Web Page Before Launch of Web Site

Figure 3:
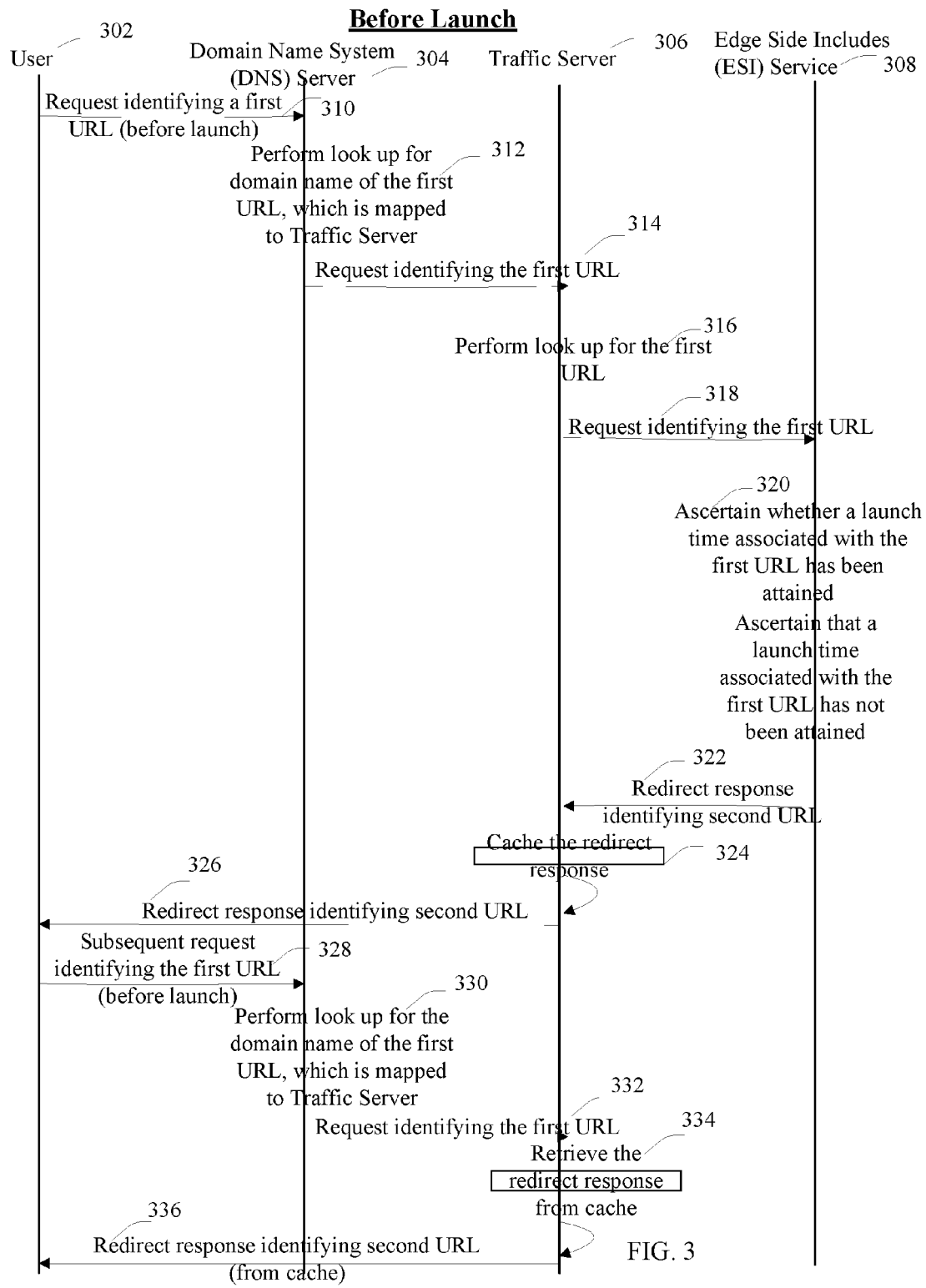
FIG. 3 is a process flow diagram illustrating an example method of serving a web page prior to launch of a web site in accordance with various embodiments.

FIG. 3 is a process flow diagram illustrating an example method of serving a web page prior to launch of a web site in accordance with various embodiments. Steps performed by a user (or corresponding client), Domain Name System (DNS) Server, Traffic Server, and ESI service will be shown and described with reference to vertical lines 302, 304, 306, and 308, respectively. The Traffic Server may be implemented at an edge server. While there may be more than one Traffic Server, a single Traffic Server is shown to simplify the illustration. In addition, the ESI service may be implemented via one or more servers.

When the user attempts to access the first URL via a browser before launch time, the browser may send a request (e.g., HTTP request) identifying the first URL at 310. Upon receiving the request, the DNS Server may perform a look up for a domain name of the first URL at 312. Since the domain name is mapped to the Traffic Server, the DNS Server may forward the request identifying the first URL at 314 to the Traffic Server.

The Traffic Server may perform a look up for the first URL at 316. More particularly, the Traffic Server may check its cache for a response associated with the first URL. Where the Traffic Server has not previously cached a response for the first URL or cannot identify a previously cached a response for the first URL, the Traffic Server may forward a given request to the ESI service. In some embodiments, the Traffic Server may perform a look up for the first URL, which may be mapped to an identifier. Specifically, one or more mappings may be maintained, where each mapping maps a particular URL to a corresponding identifier. Thus, the Traffic Server may then provide the identifier mapped to the first URL or forward the request identifying the first URL at 318 to the ESI service.

The ESI service may ascertain whether a launch time associated with the first URL has been attained at 320. This may be accomplished based, at least in part, upon a current date, current time, and a scheduled launch time designated by a scheduled day of launch and a scheduled time of launch. More particularly, configuration information maintained by the ESI service may indicate one or more scheduled launch times, where each launch time is designated by a scheduled day of launch and a scheduled time of launch. For example, the configuration information may include a set of computer-readable instructions. The configuration information may associate each of the scheduled launch times with a corresponding URL. In addition, the configuration information may indicate a type of response and/or format of the response to be returned. In some embodiments, the configuration information may indicate whether a redirect response or an ESI response is to be returned in association with a particular time or time period. More particularly, the configuration information may indicate that prior to the launch time, a redirect response is to be returned. If a redirect response is to be returned, the configuration information may specify a second URL to be identified in the redirect response.

Upon ascertaining that a launch time associated with the first URL has not been attained, the ESI service may obtain (e.g., generate) and send a redirect response (e.g., HTTP redirect response) identifying a second URL at 322 according to the configuration information. In some implementations, the second URL may be identified from the configuration information. In order to reduce page load times for repeat visitors, the redirect response may be a cacheable redirect response.

Upon receiving the redirect response, the Traffic Server may cache the redirect response at 324 for use in processing further requests received prior to launch time. In addition, the Traffic Server may send the redirect response identifying the second URL at 326 to the user (or client). Upon receiving the redirect response, the browser will be redirected to the second URL.

When a user subsequently attempts to access the first URL via a browser prior to launch time, the browser may transmit a subsequent request (e.g., HTTP request) identifying the first URL at 328. The DNS Server may perform a look up for the domain name of the first URL at 330 and ascertain that the domain name is mapped to the Traffic Server. The DNS Server may then forward the request identifying the first URL to the Traffic Server at 332.

The Traffic Server may check its cache for a response associated with the first URL, and determine that it has previously cached a response for the first URL. Thus, the Traffic Server may retrieve the redirect response from the cache at 334 and send the redirect response identifying the second URL at 336 to the user (or client). Upon receiving the redirect response, the browser will be redirected to the second URL.

In order to ensure that the correct web page is served after launch time, the cache may expire at the launch time associated with the first URL. In this manner, any redirect responses that were previously cached may be deleted.

In accordance with various embodiments, ESI may be implemented to assist in the timely launch of a web site. As will be described in further detail below, an ESI system may provide an ESI service configured to generate and/or provide ESI responses. The ESI service may be implemented via one or more processors and one or more memories.

Edge Side Includes

ESI is a small markup language that is typically used for edge level dynamic web content assembly. One main purpose of ESI has been to tackle the problem of web infrastructure scaling by assembling a web page from page fragments retrieved from various locations or servers within the web infrastructure.

Content rendered in a web page may change for a variety of reasons. For example, content such as catalogs or forums available to a group of users or the public may change frequently. As another example, content may be personalized for a particular user or group of users. Since the content may change, this creates a problem for caching systems. In a web infrastructure having multiple servers, this change of content becomes even more problematic.

ESI Language Specification 1.0 was submitted to the World Wide Web Consortium (W3C) for approval in August 2001. ESI may be implemented by content delivery networks, as well as servers such as caching proxy servers. One or more ESI element tags may be inserted into HyperText Markup Language (HTML) or other text based content during creation of a web page. Instead of being displayed to viewers, these ESI tags may operate as directives that instruct an ESI system to take some action. Similarly, Extensible Markup Language (XML) based ESI tags may instruct the ESI system to take an action to complete assembly of a web page. One simple example of an ESI element is the include tag, which may be used to include content external to the page.

Often, the ESI system may include one or more caching proxy servers, which may store a local copy of content file(s), which can be inserted without going back to access an origin server from which the content file(s) were previously obtained. Alternatively, an entire web page including one or more ESI tags may be cached after retrieval from the origin server, enabling ESI requests to be made to the origin server. Accordingly, ESI has traditionally been used to provide different caching times for different parts of a web page, or different degrees of personalization for the web page.

ESI offers four main features:
1) inclusion of page fragments, as illustrated above;
2) variables which can be set from cookies or HTTP headers and then used in other ESI statements or in a markup language;
3) conditions that can be implemented using the variables, enabling different software instructions (e.g., markup language instructions) to be executed based upon values of the variables;
4) error handling, so that a failover to another server can be implemented if an origin server is unavailable.

While ESI offers various features, ESI has not been used to assist in the timely launch of web sites.

Serving of Web Page Via ESI Response after Launch of Web Site

Figure 4:
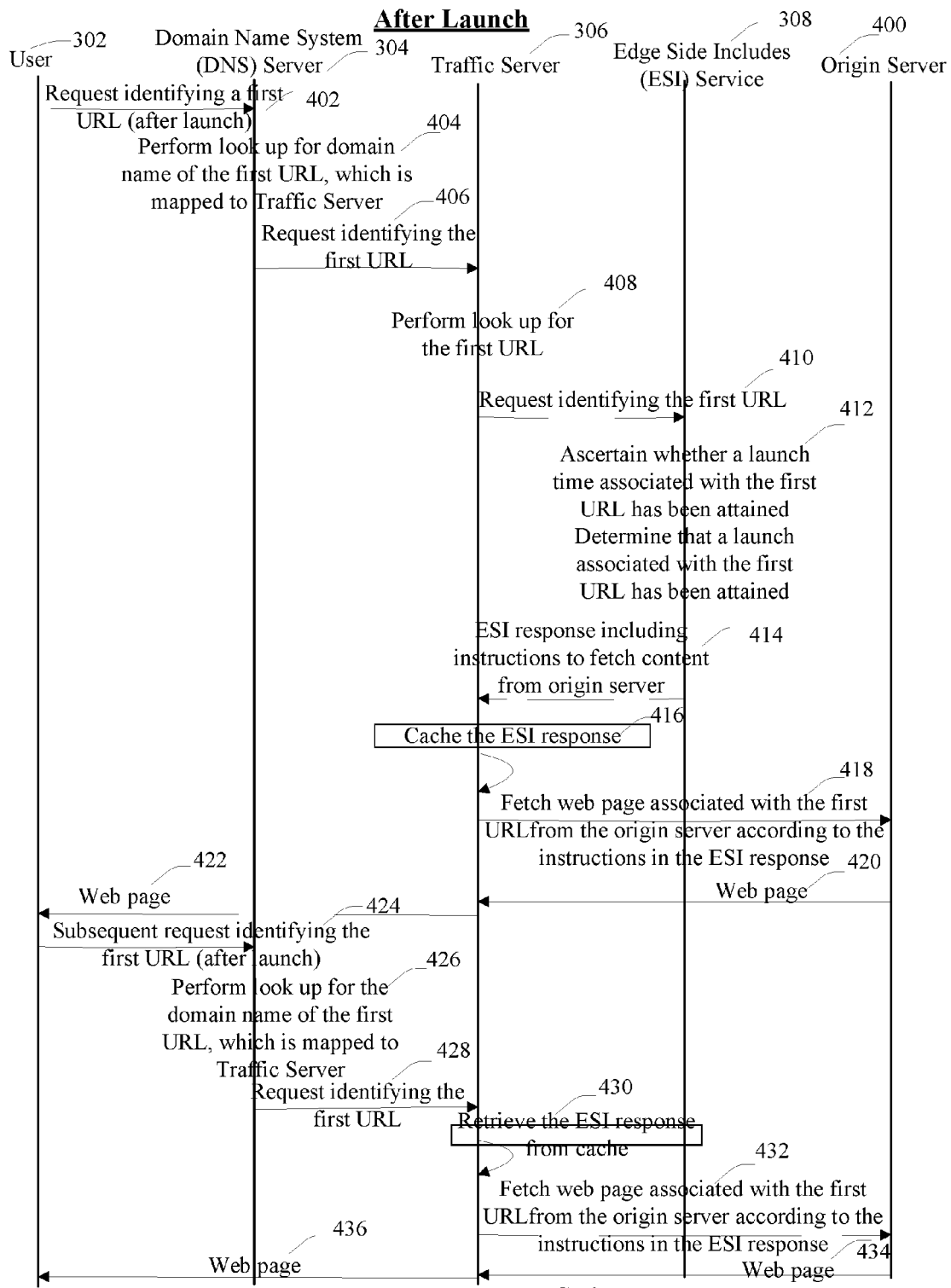
FIG. 4 is a transaction flow diagram illustrating an example method of serving a web page after launch of a web site in accordance with various embodiments.

FIG. 4 is a transaction flow diagram illustrating an example method of serving a web page after launch of a web site in accordance with various embodiments. Steps performed by a user (or corresponding client), Domain Name System (DNS) Server, Traffic Server, ESI service, and an Origin Server will be shown and described with reference to vertical lines 302, 304, 306, 308, and 400 respectively. The Traffic Server may be implemented at an edge server. While there may be more than one Traffic Server, a single Traffic Server is shown to simplify the illustration. In addition, the ESI service may be implemented via one or more servers.

When the user attempts to access the first URL via a browser at or after launch time, the browser may send a request (e.g., HTTP request) identifying the first URL at 402. Upon receiving the request, the DNS Server may perform a look up for a domain name of the first URL at 404. Since the domain name is mapped to the Traffic Server, the DNS Server may forward the request identifying the first URL at 406 to the Traffic Server.

The Traffic Server may perform a look up for the first URL at 408. More particularly, the Traffic Server may check its cache for a response associated with the first URL. Where the Traffic Server has not previously cached a response for the first URL or cannot identify a previously cached a response for the first URL, the Traffic Server may forward a given request to the ESI service. In some embodiments, the Traffic Server may perform a look up for the first URL, which may be mapped to an identifier. Specifically, one or more mappings may be maintained, where each mapping maps a particular URL to a corresponding identifier. The Traffic Server may then provide the identifier mapped to the first URL or forward the request identifying the first URL at 410 to the ESI service.

The ESI service may ascertain whether a launch time associated with the first URL has been attained at 412. This may be accomplished based, at least in part, upon a current date, current time, and a scheduled launch time designated by a scheduled day of launch and a scheduled time of launch. More particularly, configuration information maintained by the ESI service may indicate one or more scheduled launch times. The configuration information may further associate each of the scheduled launch times with a corresponding URL. In this example, it is assumed that the scheduled launch time is associated with the first URL. However, it is important to note that other URLs may also be specified in association with a particular scheduled launch time.

Upon ascertaining that a launch time associated with the first URL has been attained, the ESI service may obtain (e.g., generate) and send an ESI response including instructions to fetch content from the first URL at the Origin Server at 414 according to the configuration information. In order to reduce page load times for repeat visitors, the ESI response may be a cacheable ESI response. Thus, upon receiving the ESI response, the Traffic Server may cache the ESI response at 416 for use in processing further requests. In addition, the Traffic Server may fetch a web page associated with the first URL from the Origin Server according to the instructions provided in the ESI response at 418). Upon retrieving the web page at 420, the Traffic Server may provide the web page to the user (or client) at 422. The browser may then serve the web page.

When a user subsequently attempts to access the first URL via a browser after the launch time, the browser may transmit a subsequent request (e.g., HTTP request) identifying the first URL at 424. The DNS Server may receive the request, perform a look up for the domain name of the first URL at 426 and ascertain that the domain name is mapped to the Traffic Server. The DNS Server may then forward the request identifying the first URL to the Traffic Server at 428.

The Traffic Server may check its cache for a response associated with the first URL, and determine that it has previously cached a response for the first URL. Thus, the Traffic Server may retrieve the ESI response from the cache at 430. The Traffic Server may fetch the web page associated with the first URL from the origin server at 432 according to the instructions provided in the ESI response. Upon retrieving the web page at 434, the Traffic Server may provide the web page to the user (or client) at 436. The browser may then serve the web page.

While the embodiments described herein discuss the generation, transmission, and/or retrieval of a single ESI response, it is important to note that these examples are merely illustrative. Thus, in some embodiments, more than one ESI response may be implemented. For example, where personalization is performed according to a user profile, a second ESI response may be implemented to personalize a fragment of the web page.

Network

The disclosed embodiments may be implemented via a network to facilitate the timely launch of web sites. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Social Network

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so called 'virtual persons.' An individual's social network may be represented in a variety of forms, such as visually, electronically or functionally. For example, a "social graph" or "socio-gram" may represent an entity in a social network as a node and a relationship as an edge or a link.

Multi-Modal Communication (MMC)

Individuals within one or more social networks may interact or communicate with other members of a social network via a variety of devices. Multi-modal communication technologies refers to a set of technologies that permit interoperable communication across multiple devices or platforms, such as cellphones, smart phones, tablet computing devices, personal computers, televisions, SMS/MMS, email, instant messenger clients, forums, social networking sites (such as Facebook, Twitter, or Google), or the like.

Network Architecture

Figure 5:
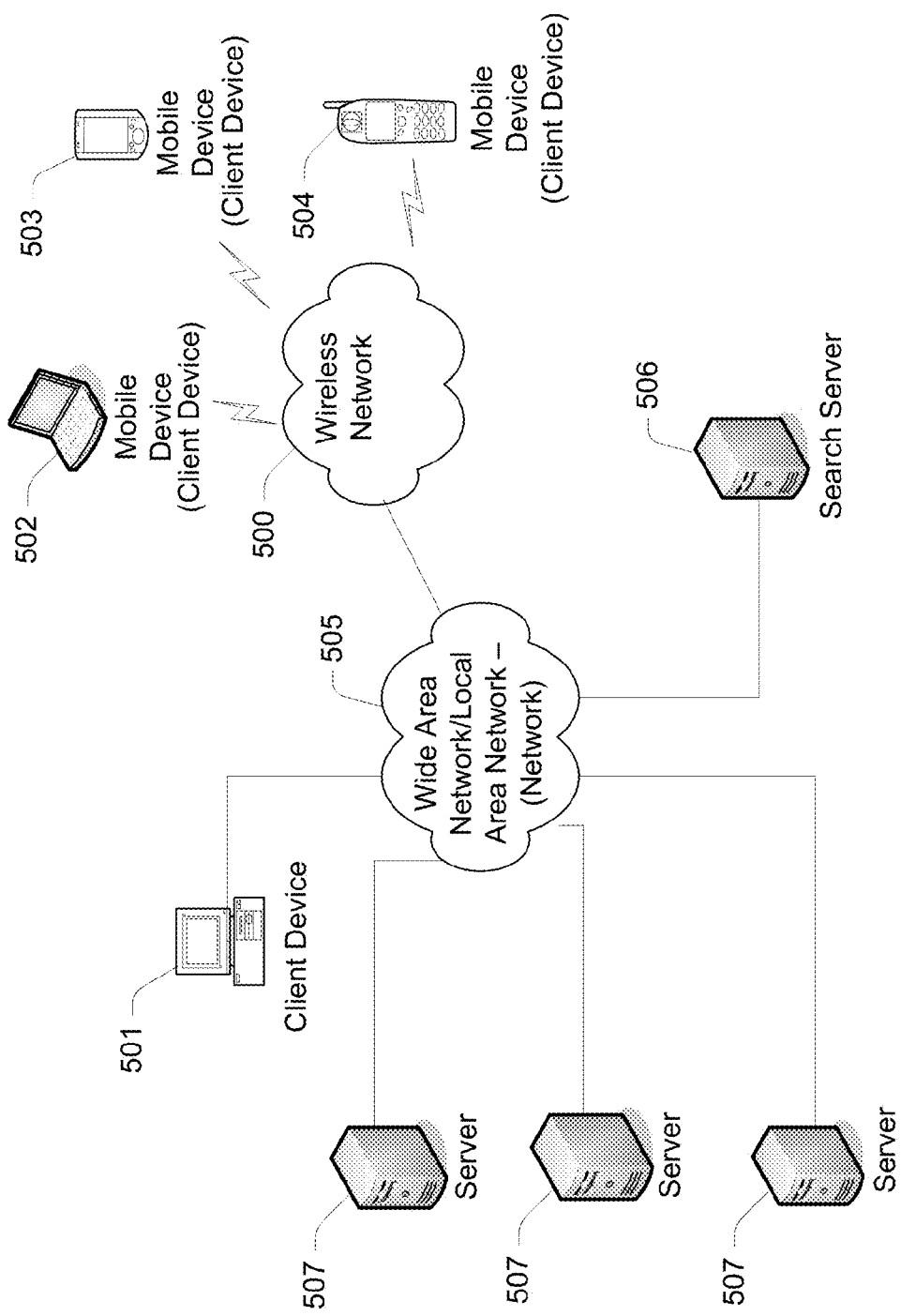
FIG. 5 is a schematic diagram illustrating an example embodiment of a network in which various embodiments may be implemented.

The disclosed embodiments may be implemented in any of a wide variety of computing contexts. FIG. 5 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 5, for example, includes a variety of networks, such as a LAN/WAN 505 and wireless network 500, a variety of devices, such as client devices 501-504, and a variety of servers 507 such as content server(s), one or more Traffic Servers, one or more ESI servers providing an ESI service, and an origin server, as set forth above. The servers may also include a search server 506 and/or an ad server (not shown). As shown in this example, the client devices 501-504 may include one or more mobile devices 502, 503, 504. Client device(s) 501-504 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The timely launch of web sites may be accomplished in a centralized manner. This is represented in FIG. 5 by server(s) 507, which may correspond to multiple distributed devices and data store(s). The server(s) 507 may support an ESI service, as well as one or more Traffic Services, as described herein. In addition, the server(s) 507 and/or corresponding data store(s) may store user account data and other user information, enabling web pages or portions thereof to be personalized.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

Client Device

Figure 6:
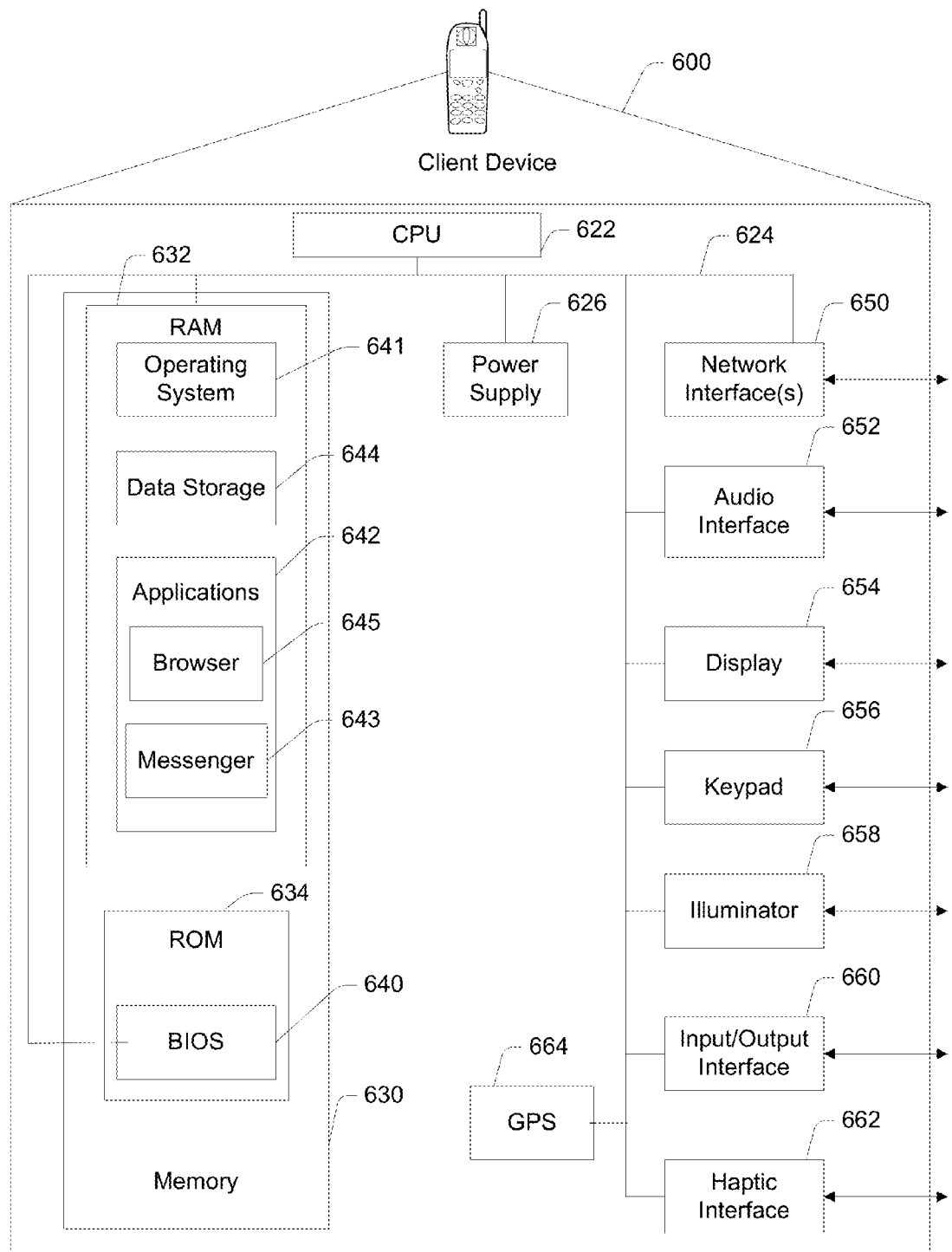
FIG. 6 is a schematic diagram illustrating an example client device in which various embodiments may be implemented.

A user may attempt to access a web site via a client device either prior to or subsequent to launch of the web site. FIG. 6 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

As shown in this example, a client device 600 may include one or more central processing units (CPUs) 622, which may be coupled via connection 624 to a power supply 626 and a memory 630. The memory 630 may include random access memory (RAM) 632 and read only memory (ROM) 634. The ROM 634 may include a basic input/output system (BIOS) 640.

The RAM 632 may include an operating system 641. More particularly, a client device may include or may execute a variety of operating systems, including a personal computer operating system, such as a Windows, iOS or Linux, or a mobile operating system, such as iOS, Android, or Windows Mobile, or the like. The client device 600 may also include or may execute a variety of possible applications 642 (shown in RAM 632), such as a client software application such as messenger 643, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 600 may also include or may execute an application to communicate content, such as, for example, textual content, multimedia content, or the like, which may be stored in data storage 644. A client device may also include or execute an application such as a browser 645 to perform a variety of possible tasks, such as browsing, searching, playing various forms of content, including locally stored or streamed video, or games (such as fantasy sports leagues).

The client device 600 may send or receive signals via one or more interface(s). As shown in this example, the client device 600 may include one or more network interfaces 650. The client device 600 may include an audio interface 652. In addition, the client device 600 may include a display 654 and an illuminator 658. The client device 600 may further include an Input/Output interface 660, as well as a Haptic Interface 662 supporting tactile feedback technology.

The client device 600 may vary in terms of capabilities or features. Claimed subject matter is intended to cover a wide range of potential variations. For example, a cell phone may include a keypad such 656 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 664 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Figure 7:
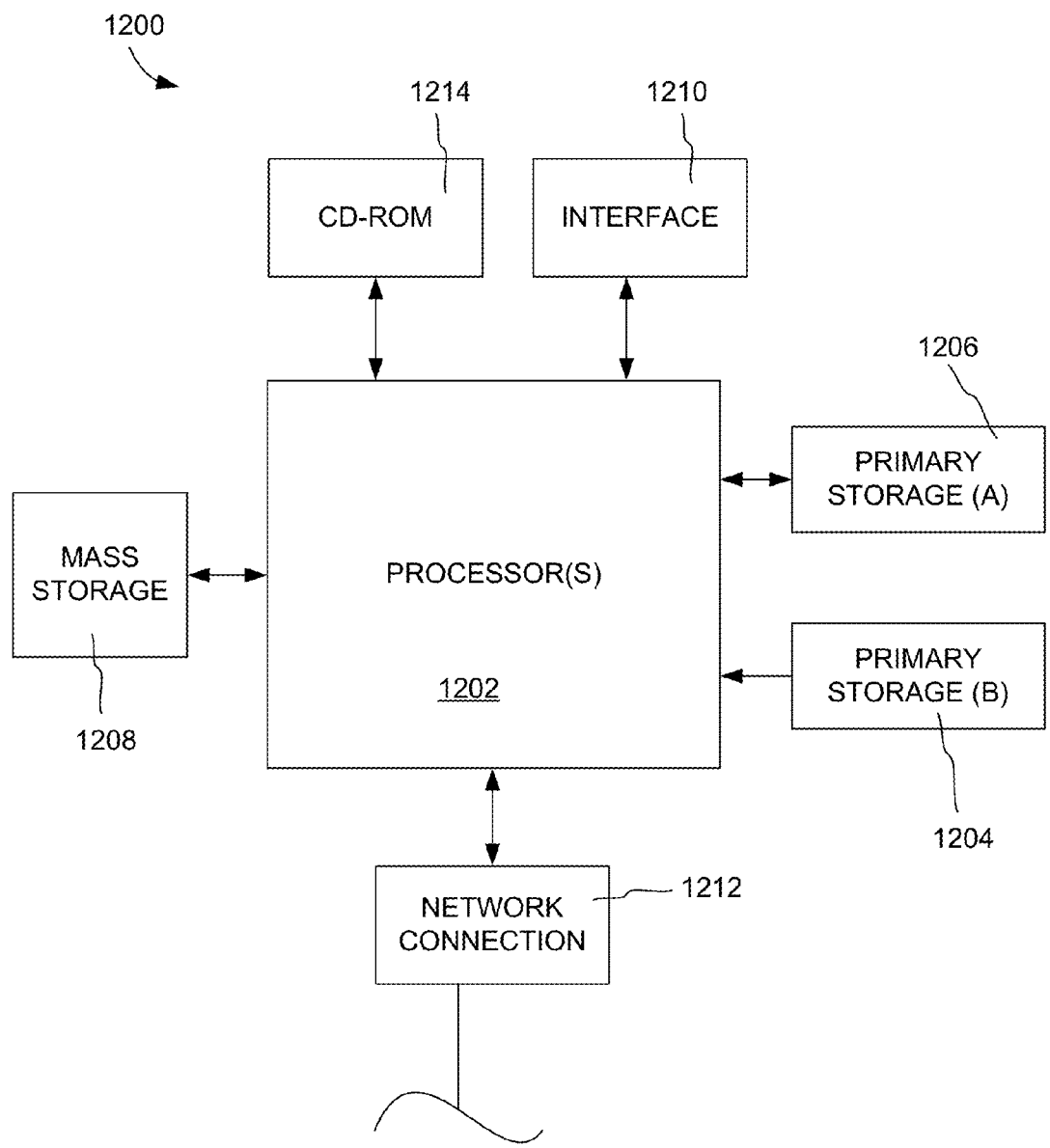
FIG. 7 is a schematic diagram illustrating an example computer system in which various embodiments may be implemented.

FIG. 7 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive, and are not to be limited to the details given herein, but may be modified within the scope and equivalents of the appended claims.

What is claimed is:

1. method, comprising:
receiving, by one or more servers, a request identifying a first Uniform Resource Locator (URL);
ascertaining, by the one or more servers, whether a launch time associated with the first URL has been attained, wherein ascertaining, by the one or more servers, is performed based, at least in part, upon a) configuration information including a scheduled date and scheduled time of at least one launch associated with the first URL and b) a current date and current time, wherein the configuration information further identifies a second URL and indicates that a redirect response identifying the second URL is to be transmitted prior to the launch time associated with the first URL;
ascertaining that the launch time associated with the first URL has not been attained; and
sending, by the one or more servers, a cacheable redirect response identifying the second URL without sending an ESI response including instructions to fetch a web page associated with the first URL from an origin server.

2. The method as recited in claim 1, further comprising:
retrieving the cacheable redirect response from a cache.

3. The method as recited in claim 2, wherein the cache expires at the launch time associated with the first URL.

4. The method as recited in claim 1, further comprising:
sending the Edge Side Includes (ESI) response upon ascertaining that the launch time associated with the first URL has been attained.

5. The method as recited in claim 4, further comprising:
obtaining the ESI response;
fetching the web page associated with the first URL from the origin server according to the instructions provided in the ESI response; and
providing the web page.

6. The method as recited in claim 5, wherein the ESI response is a cacheable ESI response, wherein obtaining the ESI response comprises:
retrieving the cacheable ESI response from the cache.

7. A non-transitory computer-readable medium storing thereon computer-readable instructions for performing operations, comprising:
receiving, by one or more servers, a request identifying a first Uniform Resource Locator (URL);
ascertaining, by the one or more servers, whether a launch time associated with the first URL has been attained, wherein ascertaining, by the one or more servers, is performed based, at least in part, upon a) configuration information including a scheduled date and scheduled time of at least one launch associated with the first URL and b) a current date and current time, wherein the configuration information further identifies a second URL and indicates that a redirect response identifying the second URL is to be transmitted prior to the launch time associated with the first URL;
ascertaining that the launch time associated with the first URL has not been attained; and
sending, by the one or more servers, a cacheable redirect response identifying the second URL without sending an Edge Side Includes (ESI) response that includes instructions to fetch a web page associated with the first URL from an origin server.

8. The non-transitory computer-readable medium as recited in claim 7, further comprising:
after ascertaining that the launch time associated with the first URL has been attained, sending the Edge Side Includes (ESI) response when it is ascertained that the launch time associated with the first URL has been attained.

9. The non-transitory computer-readable medium as recited in claim 8, wherein the ESI response is a cacheable ESI response.

10. A system, comprising:
one or more servers, each of the servers including a processor and a memory, the servers being configured for:
receiving a request identifying a first Uniform Resource Locator (URL);
ascertaining whether a launch time associated with the first URL has been attained, wherein ascertaining, by the one or more servers, is performed based, at least in part, upon a) configuration information including a scheduled date and scheduled time of at least one launch associated with the first URL and b) a current date and current time, wherein the configuration information further identifies a second URL and indicates that a redirect response identifying the second URL is to be transmitted prior to the launch time associated with the first URL;

ascertaining that the launch time associated with the first URL has not been attained; and sending a cacheable redirect response identifying the second URL without sending an Edge Side Includes (ESI) response that includes instructions to fetch a web page associated with the first URL from an origin server.

11. The system as recited in claim 10, further comprising:
a second server including a processor and a memory, the second server being configured for:
receiving the cacheable redirect response; and
storing the cacheable redirect response in a cache, thereby enabling the cacheable redirect response to be retrieved from the cache in response to subsequent requests identifying the first URL that are received prior to the launch time.

12. The system as recited in claim 11, wherein the cache expires at the launch time associated with the first URL.

13. The system as recited in claim 10, further comprising:
a second server including a processor and a memory, the second server being configured for:
ascertaining that the launch time associated with the first URL has been attained;
obtaining the ESI response;
fetching the web page associated with the first URL from the origin server according to the instructions provided in the ESI response; and
providing the web page.

14. The system as recited in claim 10:
the one or more servers being further configured for:
retrieving the cacheable ESI response from the cache.

* * * * *